Nov. 14, 1961   C. J. JACOBUS   3,008,312
GEAR TYPE COUPLING
Filed July 17, 1958
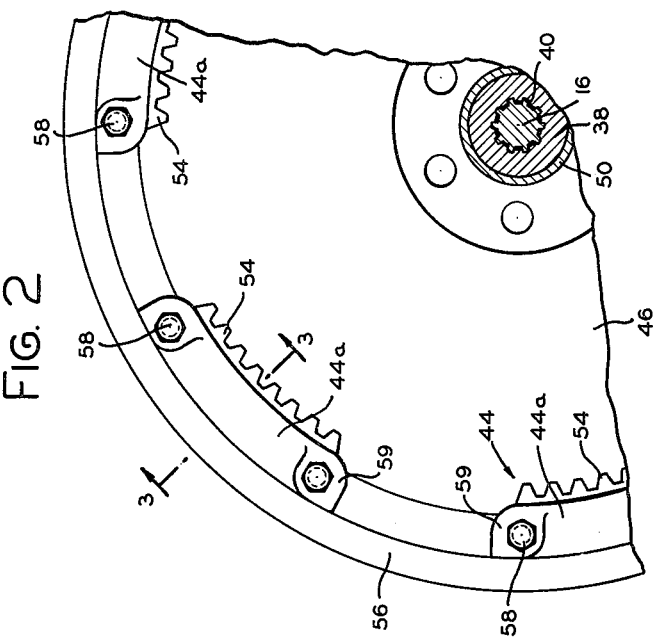
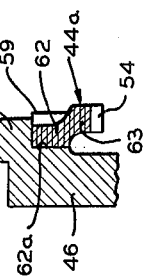
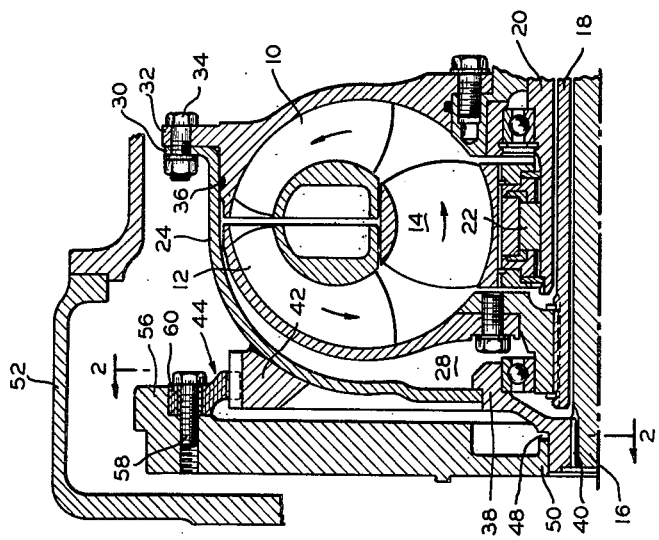
INVENTOR.
CHARLES J. JACOBUS
BY
Kenneth C. Witt
ATTY.

United States Patent Office 3,008,312
Patented Nov. 14, 1961

3,008,312
GEAR TYPE COUPLING
Charles J. Jacobus, Benton Harbor, Mich., assignor to Clark Equipment Company, a corporation of Michigan
Filed July 17, 1958, Ser. No. 749,253
9 Claims. (Cl. 64—9)

This invention relates to couplings for joining two rotary members or devices for conjoint rotation, and particularly to couplings of the so-called gear type. Such couplings conventionally comprise an outer gear or toothed member with internal teeth connected to one rotary device and an inner gear or toothed member with external teeth connected to the other rotary device, the gears being concentric and the teeth of the two gears in mesh so that rotation of one member or device drives the other member or device in unison with it.

While my invention is illustrated and described herein in a form suitable for coupling a fluid torque converter to an engine or other prime mover it will be readily understood that the invention is not limited to such use but may be used also in coupling together shafts and other rotating members and devices.

The example mentioned of coupling a fluid torque converter to an engine has posed a difficult problem. The problem is especially acute when the torque converter is closely coupled to the engine by being connected to a flywheel mounted on the engine crankshaft such as is frequently the case in torque converter equipped automobiles and other vehticles.

The difficulties in such an environment are cause by the continuous torsional vibration of the flywheel which as is well known is always present in a reciprocating piston type internal combustion engine, and the axial thrust on the torque converter caused by the heat and pressure generated in the torque converter and also sometimes by the transmission or other mechanism to which the torque converter is connected. It has been found that the portion of the torque converter confronting the engine flywheel frequently moves axially as much as one-eighth of an inch or more during operation from its stationary position, and, of course, the coupling between the flywheel and torque converter must provide for such movement.

Many types of couplings are known, but one type which has been widely used for coupling torque converters to engines and for other applications is the gear type coupling. In gear type couplings for the application being used as an example herein, that of connecting a torque converter to an engine, the coupling conventionally has taken the form of an outer annular gear or toothed member of iron or steel connected to the flywheel, this outer member having internal teeth, while the mating member connected to the impeller of the torque converter also is an annular member of iron or steel having external teeth arranged to fit in the toothed spaces of the outer coupling member. With such an arrangement it is theoretically possible to transmit torque from one toothed member to the other while allowing some axial movement between the two coupling members. As a practical matter, though, it has been found that because of manufacturing tolerances and the difficulties of securing perfect alignment during assembly that it is practically impossible to make the two elements of the coupling run exactly concentrically even though the utmost care is taken in the manufacture, and if these elements are not exactly concentric difficulties frequently result.

One solution to the problem which has been tried is to allow a small amount of backlash, that is, looseness, between the gears, to compensate for eccentricity, but it has been found that torsional vibration of the engine "frets" or chafes the teeth under such conditions and the teeth wear out too rapidly. It has also been tried to fit such steel gear couplings selectively, that is, by multiple trials of mating parts, in order to get zero backlash. This ordinarily eliminates wear of the coupling gears, but sometimes if eccentricity is present such a connection causes binding and abnormal stresses which result in bearing failures in the engine or torque converter. Another difficulty with allowing backlash when iron or steel gears are employed is that if even as much as .003 inches backlash is present the coupling may be objectionably noisy.

It is the principal object of the present invention to provide an improved gear or toothed type coupling for two rotary devices or members.

It is a further and more specific object of this invention to provide such a coupling which will permit axial movement between the members which are coupled together as well as misalignment between such members without deleterious effects on the coupling or the devices coupled together by it.

In carrying out my invention in one form I provide a coupling made up of an inner annular metal member with external teeth, and cooperating with this inner member and forming the other part of the coupling a plurality of segmental internally toothed members formed of nylon.

For a clearer and more complete understanding of my invention reference is made to the accompanying drawing in which:

FIGURE 1 is a fragmentary cross-sectional view through the upper half of a fluid torque converter coupled to a flywheel showing the general arrangement of a coupling embodying the present invention.

FIGURE 2 is a fragmentary end elevation of a portion of the improved coupling of the present invention, the view being taken substantially along the line 2—2 of FIGURE 1; and FIGURE 3 is a fragmentary cross-sectional view taken along the line 3—3 of FIGURE 2 and showing further details of the construction of a driving toothed member made in accordance with the teachings of the present invention.

Referring to FIGURE 1, there is shown a torque converter comprising three vaned elements, namely an impeller 10, a turbine 12, and a reaction member 14. The impeller 10 is coupled to a source of power, such as an internal combustion engine in a manner described in detail hereinafter, while the turbine 12 is connected to a driven sleeve 18 concentric with a shaft 16 and suitably connected for operating any desired mechanism such as a vehicle change speed transmission. The shaft 16 may be utilized for operating another mechanism such as a power take off device, for example. The reaction member 14 has an overrunning connection to a stationary reaction sleeve 20 through the medium of a one-way brake 22. The three vaned elements form a well known type of fluid torque converter.

The elements 10, 12 and 14 may be of aluminum. A dish-shaped member 24, preferably formed of sheet steel for obtaining the advantages of lightness in weight and the required strength for the transmission of torque, is joined to impeller 10. The members 24 and 10 have radially extending flanges 30 and 32, respectively, on their outer peripheries and are conventionally connected together by means of bolts 34 extending through holes in the flanges. A gasket 36 of any suitable material, such as rubber, is positioned between the members 24 and 10 and is compressed thereby to prevent leakage of fluid under pressure from the fluid chamber 28 of the torque converter.

The member 24 is secured to a hub 38, in a suitable manner such as by welding, and the hub 38 in turn is secured to the shaft 16 conveniently by means of a splined connection at 40. The member 24 is provided with a gear or annular toothed member 42 surrounding and secured to the outer surface thereof. The driven toothed member 42 is adapted and arranged to mesh with a driving member indicated generally by the numeral 44 and composed of a plurality of segmental toothed members 44a secured adjacent the outer periphery of a flywheel 46 which is concentric with the driven toothed member 42 as closely as possible.

In this mechanism, provision has been made in a known manner for axial expansion of the torque converter during operation due to the generation of heat and the internal pressure within the torque converter. This has been accomplished by providing axial clearance at 48 between the hub 38 and a hub 50 formed on the flywheel 46. The entire mechanism described herein is rotatably mounted within a suitable non-rotatable housing 52.

In order to allow for such axial expansion and the alternate contraction which accompanies it, and to provide for some eccentricity between the driving and driven elements due to tolerances in manufacture and assembly, and to compensate for torsional vibration of the engine, it has been customary with many prior art gear type couplings as mentioned previously to either resort to selective fitting of the driving and driven members of the coupling to allow some backlash between these members. However, both of these expedients have drawbacks as discussed previously. I have found that the objectionable features of the prior art constructions can be overcome by employing the coupling construction disclosed and claimed herein which include segmental toothed driving members 44a formed of nylon in the manner set forth specifically hereafter.

Referring to FIGURE 2, the driving toothed member 44 of the present invention is constructed of a plurality of spaced substantially identical segments 44a, three of which are shown herein. Any suitable number of these segments may be provided so as to form a substantially annular toothed member 44 which is interrupted at spaced points about its periphery. With spacing as shown in FIGURE 2, six segments complete the toothed member 44. Each of the segments 44a is provided with a number of teeth 54 adapted to mesh with the teeth in the driven toothed member 42. The segments 44a are formed of a material taken from the group of polyamide resins of the genus known as "nylon" having desirable characteristics for this use including: wear and abrasion resistance, low coefficient of friction, resilience, light weight, corrosion resistance, and ease of fabrication. The segments 44a are suitably formed in arcuate shape so as to have a contour corresponding to the inner diameter of an axially extending flange 56 at the outer periphery of the flywheel 46 and are secured to the flywheel by means of bolts 58 extending through apertures in bosses 59 formed at each end of each segment and threaded into suitably tapped holes in the flywheel. In order to prevent undue compressive stress on the segments 44a by the bolts 58, each of the apertures in the segments is formed sufficiently large in diameter to receive a suitable metallic bushing 60 as shown in FIGURE 1. The segments may be fabricated by a number of different processes, such as: injection molding, by cold pressing and sintering, and fabricating from standard shapes by standard metal working tools. It has been found that the molding process is most desirable and is the preferred manner of forming these segments since certain advantages are attained such as elimination of scrap material and the fact that molded segments and the teeth thereof exhibit much smaller variation in quality and tolerance than do pressed or cut toothed segments. In addition the smoother surfaces and rounded corners produced by molding reduce stress concentrations at such locations as the roots of the teeth. It is desirable also in many cases to use nylon which is reinforced with glass fibers instead of plain nylon inasmuch as the former has about twice the strength of the latter.

Referring to FIGURE 3, it will be seen that the body portion of the segments 44a between the bosses 59 include two offset portions 62 and 63. Portion 62 is in contact both with the face of the flywheel 46 and the flange 56 thereof, while portion 63 has the teeth 54 thereon. It will be observed that the cross-sectional width of this body portion of the segment is approximately uniform from top to bottom. This width is not exactly uniform because for practical reasons of manufacture and assembly it may be desirable to have some variations. For example, it is desirable to have a flat surface 62a of considerable extent on the left side of portion 62 to abut the flywheel 46. However, it is important to have aprpoximately a uniform amount of material in the body portion of the segment from the root of the teeth up to the top of the segment. Such structural arrangement provides for more uniform distribution and absorption of shocks loads throughout the segment. As an aid in understanding the requirements of the segment structure it is pointed out that it is not desirable to have portion 62 of this segment as thick as body portions 59 because this would not provide equal shock resisting qualities.

It is important also that the driving toothed member 44 be made of a plurality of segments 44 because of the relatively high coefficient of expansion of nylon due to heat and moisture absorption, which tends to make this material expand to a greater degree than metal. By making the driving toothed member 44 of spaced segments, the dimensions of each segment are kept relatively small in comparison to a complete molded internally toothed annular member and, therefore, the expansion of each segment due to heat or moisture absorption is relatively small. A plurality of such small expansions can be tolerated whereas the larger total expansion which would result if all segments were connected together to form a single member could not. Closer fits between the teeth 54 of the segments 44a and the teeth of the driven toothed member 42 can be had, therefore, without danger of the coupling "binding up" during operation and producing damage to the coupling itself or to other parts.

With the nylon segments 44a it is possible to compensate for eccentricity of the various elements of the engine and the torque converter by providing a substantially greater amount of backlash between the teeth of the mating toothed members 42 and 44, such backlash being preferably, in the range of .007 to .010 inch, without the attendant disadvantages as encountered in the use of backlash in mating metallic members as previously mentioned.

The present structure lends itself readily to present-day mass production techniques in that a relatively great amount of backlash may be provided between the mating teeth of the toothed members 42 and 44 to compensate for eccentricity of the various elements and allow the toothed members to move in and out axially relatively to one another; yet, the structural characteristics and arrangement of the nylon driving segments is such that objectionable noise and wear is eliminated thereby making for more trouble-free operation. When both coupling members are of metal even .003 inches of backlash may produce objectionable noise and fretted wear.

While the present invention has been described in a preferred embodiment in which the outer member with the segments mounted thereon is the driving member and the inner rigid toothed member is the driven member, it will be apparent to those skilled in the art that the driving and driven members can be reversed, the segments can be located on the inner instead of the outer member, and that other modifications and embodiments may be made. Therefore, it is not intended that the invention be limited to the particular embodiment described herein, nor otherwise than by the terms of the appended claims.

I claim:

1. A gear type coupling for joining two members for conjoint rotation, comprising an inner circular externally toothed coupling member adapted to be connected to one of the said first-mentioned members, and an outer coupling member having a plurality of separate, spaced apart toothed segments of nylon mounted thereon in mesh with the said inner coupling member, each of the said toothed segments having a body portion and a tooth portion offset from the said body portion and the transverse cross-section of the body portion and the said offset tooth portion thereon being of approximately uniform width, the said outer coupling member adapted to be connected to the other of the said first-mentioned members.

2. A gear type coupling comprising a first rotatable member having a rigid annular externally toothed portion thereon, a coaxially located rotatable member having a plurality of separate, spaced apart toothed nylon segments mounted thereon in mesh with the said rigid externally toothed portion, each of said nylon segments having a body portion and a tooth portion integral with but offset from the said body portion and the body portion being of approximately uniform cross-section for transmitting torsional forces between the said second member and the said tooth portion of the segment.

3. A resilient segment member for a coupling comprising, an arcuate body portion having the outer part thereof offset from the inner part, a pair of bosses adjacent the respective ends of said body portion having openings therethrough for connecting means, and a toothed portion along one edge of said body portion, the said body portion having an approximately uniform effective depth from the tooth roots to the opposite arcuate edge.

4. A nylon segment for a gear type coupling comprising an arcuate body portion having a flat surface on one side, a pair of bosses at the ends of the said body portion and openings through the bosses for connecting means, an offset tooth portion along the inner arcuate edge of the segment, and the transverse cross-section of the said body portion and the offset tooth portion thereon being of approximately uniform width.

5. A coupling mechanism for driving and driven members arranged for conjoint rotation comprising, an annular rigid toothed element in substantially axial alignment with and secured to one of said members, toothed means secured to the other of said members and comprising a plurality of separate spaced toothed segments made of resilient material and meshing with said rigid toothed element, each of the said toothed segments having a body portion and a tooth portion offset from the said body portion, and the transverse cross-section of the said body portion and the offset tooth portion thereon being of approximately uniform width.

6. A coupling mechanism comprising in combination, a rotatable driven member, a driving member substantially coaxial with said driven member, said driving member and said driven member being adapted and arranged for limited axial movement relative to one another, an annular rigid toothed element secured to one of said members, and a plurality of spaced toothed elements of resilient material secured to the other of said members and adapted and arranged to mesh with said rigid toothed element to form a driving connection, each of the said toothed elements comprising an arcuate body portion having the outer part thereof offset from the inner part and a tooth portion along the inner arcuate edge of the said body portion, the transverse cross-section of the said body portion being of approximately uniform effective thickness, the resilience of said spaced toothed elements compensating for slight misalignment between the said members and facilitating the axial movement of said members relative to one another.

7. A coupling mechanism as specified in claim 6, wherein said rigid toothed element and said spaced toothed elements are formed so as to have a substantial amount of backlash between the mating surfaces thereof.

8. A coupling mechanism as specified in claim 7, wherein the amount of backlash between the mating surfaces of said rigid toothed element and said spaced toothed elements is in the range of .007 to .010 of an inch.

9. In a coupling mechanism for substantially axially aligned driving and driven members adapted and arranged for conjoint rotation, first annular rigid toothed means secured to one of said members, second toothed means secured to the other of said members and meshing with said first toothed means, said second toothed means comprising a plurality of spaced toothed segments made of nylon and having the toothed portion thereof offset axially from said other member, and said spaced segments having a substantially uniform cross-sectional thickness to thereby uniformly distribute shock absorption therethrough during rotation of said members.

References Cited in the file of this patent

UNITED STATES PATENTS

| | | |
|---|---|---|
| 1,980,933 | Simons | Nov. 13, 1934 |
| 2,461,217 | Lapsley et al. | Feb. 8, 1949 |
| 2,659,217 | Talbot | Nov. 17, 1953 |
| 2,688,856 | Heisler | Sept. 14, 1954 |
| 2,699,656 | Anderson et al. | Jan. 18, 1955 |
| 2,741,353 | Ward | Apr. 10, 1956 |
| 2,857,777 | Porter | Oct. 28, 1958 |

FOREIGN PATENTS

| | | |
|---|---|---|
| 839,967 | France | Jan. 7, 1937 |